United States Patent
Dove et al.

(10) Patent No.: US 8,088,266 B2
(45) Date of Patent: Jan. 3, 2012

(54) ELECTRODIALYSIS METHOD FOR PURIFYING OF SILICATE-CONTAINING POTASSIUM HYDROXIDE ETCHING SOLUTION

(75) Inventors: Curtis Douglas Dove, Kaohsiung (TW); Goang Cheng Chang, Kaohsiung (TW); Wei-Liang Yang, Hsinchu (TW)

(73) Assignee: Asia Union Electronic Chemical Corporation, Taipei (TW)

( * ) Notice: Subject to any disclaimer, the term of this patent is extended or adjusted under 35 U.S.C. 154(b) by 427 days.

(21) Appl. No.: 12/389,676

(22) Filed: Feb. 20, 2009

(65) Prior Publication Data

US 2010/0213077 A1      Aug. 26, 2010

(51) Int. Cl.
*B01D 61/44* (2006.01)
(52) U.S. Cl. ..................................... 204/520; 204/528
(58) Field of Classification Search ........... 204/520–542
See application file for complete search history.

(56) References Cited

U.S. PATENT DOCUMENTS

| 4,410,405 A | * | 10/1983 | Bergna | ............................ 204/515 |
| 4,556,466 A | * | 12/1985 | Scott et al. | ..................... 204/517 |

* cited by examiner

*Primary Examiner* — Arun S Phasge
(74) *Attorney, Agent, or Firm* — Morris Manning & Martin LLP; Tim Tingkang Xia, Esq.

(57) ABSTRACT

An electrodialysis method for the treatment of silicate-containing potassium hydroxide etching waste solution is provided. The method comprises: providing a reaction tank including a cathode, an anode, and two cation dialysis membranes, wherein the reaction tank is divided by the cation dialysis membranes into a cathode chamber, an anode chamber and a waste solution disposing chamber located therebetween; filling a sulfuric acid solution into the anode chamber; filling a potassium hydroxide solution into the cathode chamber; introducing a silicate-containing potassium hydroxide etching waste solution into the waste solution disposing chamber; and applying a voltage and a current density to each of the chambers to render potassium ions to transport from the waste solution chamber through the cation dialysis membrane to the cathode chamber.

15 Claims, 1 Drawing Sheet

ELECTRODIALYSIS METHOD FOR PURIFYING OF SILICATE-CONTAINING POTASSIUM HYDROXIDE ETCHING SOLUTION

BACKGROUND OF THE INVENTION

1. Field of the Invention

The subject invention relates to an electrodialysis method, and more particularly, to an electrodialysis method for the treatment of a silicate-containing potassium hydroxide etching waste solution.

2. Descriptions of the Related Art

Owing to such advantages as high flexibility in operation, small space occupation of equipment, high purity of resulting products and good adaptability to conductivity of materials to be processed, the electrodialysis (ED) process is known as a waste solution process that is commonly used, for example, for radioactive waste solution treatment, recovery of valuable metals from waste electroplating solutions, etc. Also, the electrodialysis process may also be used in such processes as production of table salts or pre-treatment of boiler water. The principle of the electrodialysis process is that the ion exchange membranes having distinct properties are used to selectively separate ions in the water, and the migration of the ions in the water is driven by positive and negative direct currents (DC) to attract ions. In other words, this process utilizes the characteristic that the cations can only penetrate through cation exchange membranes while the anions can only penetrate through anion exchange membranes. Under the action of the applied DC electric field, the anions in the water migrate towards the anode while the cations in the water migrate towards the cathode, thereby accomplishing the purpose of recovering valuable substances from the waste solution.

The etching waste solutions of general semiconductor industries contain in addition to strong alkaline etching solutions (e.g., potassium hydroxide), also silicon dioxide etched away from semiconductor substrates and metal oxides (e.g., potassium oxide) formed during the reactions. The silicon dioxide and metal oxides often form in the waste etching solutions colloidal silicates, which are generally known as water glass and may be normally represented by a general formula $M_xO_y \cdot nSiO_x$ (where M represents a metal such as Na or K, coefficients x and y vary with species of the metal, and n also varies with species of the metal and is within a specific range). Therefore, if the etching waste solutions are directly introduced into a single-membrane electrodialysis system for recovery, the silicates contained in the etching waste solutions tend to cause clogging to the ion exchange membrane of the electrodialysis system, resulting in deactivation or even loss of the ion exchange capability thereof. Moreover, the anode is also liable to be surrounded and absorbed by the silicates, and consequently fails in efficacy. Hence, no electrodialysis method has been provided up to now that is capable of effectively treating silicate-containing waste solutions for separation and recovery of useful substances therefrom.

Etching solutions currently used in semiconductor industries are mostly potassium hydroxide or sodium hydroxide solution. If such etching waste solutions are subjected to the waste treatment or directly used to produce products of low economic values, poor economic benefits would result.

In view of this, the subject invention provides an electrodialysis method capable of treating a potassium silicate-containing waste solution and solving the problem of clogging the ion exchange membranes during electrodialysis. This method can not only recover potassium ions from the waste solution effectively and economically, but also recover potassium silicates with a low content of potassium for use in other industrial applications (e.g., for use in producing water glass after being concentrated), thereby achieving the goal of waste reduction and resource recycling effectively.

SUMMARY OF THE INVENTION

One objective of the subject invention is to provide an electrodialysis method for the treatment of a silicate-containing potassium hydroxide etching waste solution, comprising:

providing a reaction tank including a cathode, an anode, and two cation dialysis membranes, wherein the reaction tank is divided by the cation dialysis membranes into a cathode chamber, an anode chamber and a waste solution chamber located therebetween;

filling a sulfuric acid solution into the anode chamber;

filling a potassium hydroxide solution into the cathode chamber;

introducing a silicate-containing potassium hydroxide etching waste solution into the waste solution chamber; and applying a voltage and a current density to each of the chambers to render potassium ions to transport from the waste solution chamber through the cation dialysis membrane to the cathode chamber.

Some embodiments implemented for the subject invention are described in detail in the following paragraphs accompanying the appended drawing for people skilled in this field to well appreciate the above purpose, technical features, and advantages of the subject invention.

DESCRIPTION OF THE PREFERRED EMBODIMENT

Figure 1:
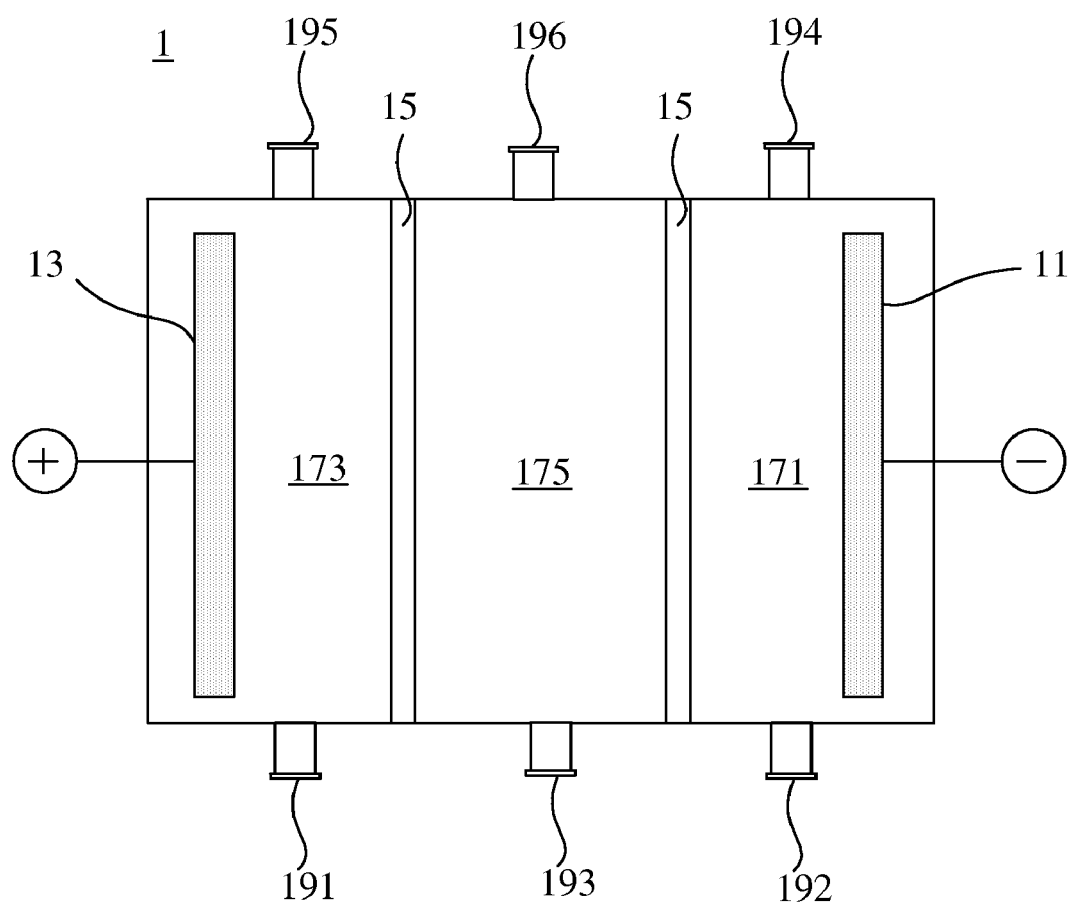
FIG. 1 is an embodiment of equipment for implementing the electrodialysis method of the subject invention.

Hereinafter, some embodiments of the subject invention will be described in detail with reference to the attached drawing. However, the subject invention may also be practiced in a number of different embodiments without departing from the spirits of the subject invention. Therefore, the scope of protection of the subject invention shall not be construed to be limited to what described herein. Furthermore, rather than being depicted in the practical scale, dimensions of elements and regions in the attached drawing may be exaggerated for the sake of clarity.

Because the potassium hydroxide etching waste solutions of the semiconductor industries contain potassium hydroxide that are not consumed completely, potassium oxide, as well as, silicon dioxide resulting from etching silicon substrates, the solutions tend to form colloidal solutions of potassium silicates. When recovering substances from such waste solutions through the electrodialysis process, the potassium silicates tend to clog the ion exchange membranes, resulting in deactivation or even loss of the ion exchange capability thereof. No effective electrodialysis method adapted to recover such silicate-containing waste solutions has been provided up to now.

It has been found that, the voltage and current applied during the electrodialysis process may be regulated to control the mole ratio of potassium oxide to silicon dioxide in the waste solution such that the silicate-containing potassium hydroxide etching waste solution remains in a solution state instead of forming a colloid that can clog the ion exchange membrane. In this way, potassium ions can be recovered through the electrodialysis process while the remaining silicates with a low potassium content can still be used in other industrial applications.

Accordingly, the subject invention provides an electrodialysis method for the treatment of a silicate-containing potassium hydroxide etching waste solution, comprising:

providing a reaction tank 1 as shown in FIG. 1, wherein the reaction tank 1 includes a cathode 11, an anode 13 and two cation dialysis membranes 15, and is divided by the cation dialysis membranes 15 into a cathode chamber 171, an anode chamber 173 and a waste solution chamber 175 located therebetween;

filling a sulfuric acid solution through an anode inlet 191 into the anode chamber 173, wherein the concentration of the sulfuric acid solution used is typically adapted to initiate an oxidation reaction of the solution in the anode chamber 173, and generally ranges from about 1 wt % to about 20 wt %, preferably from about 2 wt % to about 15 wt %, and more preferably from about 3 wt % to about 10 wt %;

filling a potassium hydroxide solution through a cathode inlet 192 into the cathode chamber 171, wherein the concentration of the potassium hydroxide solution used is typically adapted to initiate a reduction reaction of the solution in the cathode chamber 171, and generally ranges from about 1 wt % to about 50 wt %, preferably from about 2 wt % to about 30 wt %, and more preferably from about 2 wt % to about 10 wt %;

introducing a silicate-containing potassium hydroxide etching waste solution to be treated through a waste solution inlet 193 into the waste solution chamber 175, wherein for the etching waste solutions generated in typical etching processes, the concentration of potassium hydroxide generally ranges from about 1 wt % to about 50 wt %; and applying a voltage and a current density to each of the chambers by connecting a negative terminal and a positive terminal of a DC power supply to the cathode 11 and the anode 13 respectively, thereby to render potassium ions to transport from the waste solution chamber 175 through the cation dialysis membrane 15 to the cathode chamber 171.

When the electrodialysis method of the subject invention is performed, the potassium ions in the silicate-containing potassium hydroxide etching waste solution are driven by the applied voltage to migrate from the waste solution chamber 175 through the cation dialysis membrane 15 into the cathode chamber 171 where they are reduced into potassium hydroxide with concomitant hydrogen gas. As a result, the concentration of the potassium hydroxide solution in the cathode chamber 171 is increased, and then, the solution is discharged from a cathode outlet 194. On the other hand, an oxidation reaction is conducted in the anode chamber 173 in which the water is electrolyzed into oxygen gas, and the resulting oxygen gas is discharged from an anode outlet 195. In the waste solution chamber 175, a silicate-containing solution with a low potassium content results and is discharged from a waste solution outlet 196.

The concentrated potassium hydroxide solution obtained in the cathode chamber 171 can be used directly as an etching solution in semiconductor industries, or for other purposes. The resulting hydrogen gas may be used as a fuel in fuel cells or steam boilers, or for other purposes. The silicate-containing solution in the waste solution chamber 175 may be concentrated to form water glass for industrial use, such as for use in inorganic paints or adhesives, or for agricultural use, such as for use as a potassium fertilizer or an antibacterial agent of fruit trees. The oxygen gas produced in the anode chamber 173 is also of great economic value.

According to the method of the subject invention, the applied voltage and current are, in principle, designed. The voltage generally ranges from about 2 V to about 25 V, and preferably from about 4 V to about 20 V; the current density generally ranges from about 1,000 A/m$^2$ to about 6,000 A/m$^2$. Potassium ions in the waste solution are driven from the waste solution chamber 175 through the cation dialysis membrane 15 into the cathode chamber 171. In particular, a mole ratio of silicon dioxide to potassium oxide in the waste solution chamber 15 is controlled to be within a particular range, i.e., less than about 10, and more preferably, less than about 5.0, thereby to avoid the formation of colloids which would otherwise clog the ion dialysis membranes. According to an embodiment of the subject invention, the electrodialysis process is performed with a current density of about 2,000 A/m2 and a voltage ranging from about 5 V to about 15 V There is no particular limitation to the anode material useful for the subject invention. For example, the substrate material of the anode is typically selected from titanium (Ti), tantalum (Ta), nickel (Ni) or the like metals. The surface of the substrate may be coated with a non-deactivatable and electrocatalytic film, the material of which may be an oxide of platinum (Pt), iridium (Ir), rhodium (Rh), ruthenium (Ru), zirconium (Zr), titanium (Ti) or the like metals, or a conductive (discharging) substance comprising at least one of the aforesaid metal oxides. For example, the film may be formed by coating an organic compound comprising at least one of the aforesaid metals (e.g., iridium alcoholates, ruthenium alcoholates, tantalum alcoholates, or titanium alcoholates, where the alcohols used may be such as methanol, ethanol, propanol, butanol, isopropanol, isobutanol and the like.) on the surface of the metallic substrate, followed by a sintering process to remove the organic components. In an embodiment of the subject invention, a dimensionally stable anode (DSA) is used, i.e., an insoluble anode formed by coating a film of a tantalum oxide, a ruthenium oxide, a titanium oxide or an iridium oxide on a substrate made of titanium, tantalum, nickel or the like, because this kind of anodes has such advantages as preferable electrocatalysis and long service life of more than one year.

There is no particular limitation to the cathode material useful in the subject invention. For example, the cathode material may be nickel, iron, stainless steel, nickel-plated titanium, graphite, carbon steel, or a combination thereof. In an embodiment of the subject invention, the stainless steel is used.

Additionally, any suitable cation dialysis membrane may be used in the method of the subject invention. Typically, an acid- and alkaline-resistant perfluorinated cation exchange membrane is used, such as those selected from a group consisting of a perfluorosulfonic acid membrane, a perfluorocarboxylic acid membrane, a fluorinated membrane of perfluorosulfonic acid/perfluorocarboxylic acid and a carbon polymer membrane. In an embodiment of the subject invention, a perfluorosulfonic acid cation exchange membrane is used.

To further illustrate the subject invention, an example will be further described hereinbelow with reference to the attached drawing.

Example 1

According to the method of the subject invention, an electrodialysis process for the treatment of a silicate-containing potassium hydroxide etching waste solution was carried out in the reaction tank 1 as shown in FIG. 1 using the following parameters:

operating voltage: 5 to 15 V
operating temperature: 30 to 70° C.
current density: 2,000 A/m$^2$
area of the mass transport electrode: 0.05 m$^2$
anode material: DSA
cathode material: stainless steel
cation dialysis membrane: perfluorosulfonic acid cation exchange membrane In this example, a 5 wt % sulfuric acid solution was filled through the anode inlet 191 into the anode chamber 173, a 2 wt % potassium hydroxide solution was filled through the cathode inlet 192 into the cathode chamber 171, and a potassium silicate-containing waste solution to be treated (containing potassium hydroxide at a concentration of about 10 wt % to about 45 wt %) was introduced through the waste solution inlet 193 into the waste solution chamber 175. Afterwards, an electrodialysis process was carried out in batch under conditions of a constant current and an initial voltage of 5 V, and deionized water was replenished into the anode chamber 173 from time to time to maintain a constant liquid level. According to the voltage increase readings, the mole ratio of silicon dioxide to potassium oxide in the solution within the waste solution chamber 175 was controlled to be less than 5, and the reference operation end of the batch is attained when the voltage increased to 12 V.

Hydrogen gas and a potassium hydroxide solution were obtained in a considerable amount from the cathode outlet 194 of the cathode chamber 171. The concentration of the recovered potassium hydroxide solution could be increased from 2% to 50%. From the waste solution outlet 196 of the waste solution chamber 175, a potassium silicate water glass solution with a low potassium content having a solid content of about 2 wt % to about 10% was obtained, which could be concentrated to produce 10 wt % to 40 wt % potassium silicate water glass products. From the anode outlet 195 of the anode chamber 173, oxygen gas and a 5 wt % sulfuric acid solution were obtained. After the oxygen gas was separated and stored, the sulfuric acid solution could be reused in the manufacturing process.

According to the above descriptions, besides that the electrodialysis method of the subject invention can be used to treat a silicate-containing potassium hydroxide etching waste solution and efficiently recover potassium ions, all byproducts thus produced present an economic value and can be used in industrial applications (e.g., the hydrogen gas may be used as a fuel, and the silicate-containing solution with a low potassium content may be further concentrated to produce water glass). The potassium hydroxide solution having a high concentration obtained in the above example may be reused directly as an etching solution in the semiconductor industries and exhibits considerable economic value. Furthermore, the two-membranes-and-three-chambers design including two cation membranes can prevent the anode from directly being contact with the waste solution to be treated which has a complex composition and prevent ions contained in the waste solution from migrating into the anode chamber, thereby prolonging the service life of the anode and, consequently, enhancing the durability of the equipment as a whole and improving the economic benefits.

The above example is provided to illustrate the principle and effectiveness of the subject invention and show the technical features thereof. Any modifications or replacements that can be easily accomplished by persons skilled in the art without departing from the technical principles and spirits of the subject invention are within the scope claimed by the subject invention. Therefore, the scope of protection of the subject invention is covered in the following claims as appended.

What is claimed is:

1. An electrodialysis method for the treatment of a silicate-containing potassium hydroxide etching waste solution, comprising:

providing a reaction tank including a cathode, an anode, and two cation dialysis membranes, wherein the reaction tank is divided by the cation dialysis membranes into a cathode chamber, an anode chamber and a waste solution chamber located therebetween;

filling a sulfuric acid solution into the anode chamber;

filling a potassium hydroxide solution into the cathode chamber;

introducing a silicate-containing potassium hydroxide etching waste solution into the waste solution chamber; and applying a voltage and a current density to each of the chambers to render potassium ions to transport from the waste solution chamber through the cation dialysis membrane to the cathode chamber, and to control the mole ratio of silicon dioxide and potassium oxide in the waste solution chamber to be less than 10.

2. The method according to claim 1, wherein the concentration of the sulfuric acid solution ranges from about 1 wt % to about 20 wt %.

3. The method according to claim 2, wherein the concentration of the sulfuric acid solution ranges from about 2 wt % to about 15 wt %.

4. The method according to claim 3, wherein the concentration of the sulfuric acid solution ranges from about 3 wt % to about 10 wt %.

5. The method according to claim 1, wherein the concentration of the potassium hydroxide solution ranges from about 1 wt % to about 50 wt %.

6. The method according to claim 5, wherein the concentration of the potassium hydroxide solution ranges from about 2 wt % to about 30 wt %.

7. The method according to claim 6, wherein the concentration of the potassium hydroxide solution ranges from about 2 wt % to about 10 wt %.

8. The method according to claim 1, wherein the concentration of potassium hydroxide in the silicate-containing potassium hydroxide etching waste solution ranges from about 1 wt % to about 50 wt %.

9. The method according to claim 1, wherein the cation dialysis membranes are perfluorinated cation exchange membranes.

10. The method according to claim 9, wherein the cation dialysis membranes are selected from a group consisting of a perfluorosulfonic acid membrane, a perfluorocarboxylic acid membrane, a fluorinated membrane of perfluorosulfonic acid/perfluorocarboxylic acid and a carbon polymer membrane.

11. The method according to claim 1, wherein the voltage ranges from about 2 V to about 25 V and the current density ranges from about 1,000 A/m$^2$ to about 6,000 A/m$^2$.

12. The method according to claim 11, wherein the voltage ranges from about 4 V to about 20 V.

13. The method according to claim 12, wherein the voltage ranges from about 5 V to about 15 V and the current density is about 2,000 A/m$^2$.

14. The method according to claim 1, wherein the step of applying a voltage and a current density to each of the chambers comprises generating hydrogen gas in the cathode chamber and oxygen gas in the anode chamber.

15. The method according to claim 1, wherein the mole ratio of silicon dioxide and potassium oxide is less than 5.

* * * * *

UNITED STATES PATENT AND TRADEMARK OFFICE
CERTIFICATE OF CORRECTION

PATENT NO. : 8,088,266 B2
APPLICATION NO. : 12/389676
DATED : January 3, 2012
INVENTOR(S) : Curtis Douglas Dove et al.

Page 1 of 1

It is certified that error appears in the above-identified patent and that said Letters Patent is hereby corrected as shown below:

On the cover page of the patent, Column 1, Item 73:

"Assignee: Asia Union Electronic Chemical Corporation, Taipei (TW)"

should read:

--Assignee: Kismart Corporation, Taipei (TW); Asia Union Electronic Chemical Corporation, Taipei (TW)--

Signed and Sealed this
Sixth Day of November, 2012

David J. Kappos
*Director of the United States Patent and Trademark Office*